US010134012B1

(12) United States Patent
Groman

(10) Patent No.: US 10,134,012 B1
(45) Date of Patent: Nov. 20, 2018

(54) SYSTEM AND METHOD FOR UTILIZATION-BASED COMPUTING OF EMISSIONS ATTRIBUTABLE TO SPECIFIC EQUIPMENT

(75) Inventor: Kevin J. Groman, Scottsdale, AZ (US)

(73) Assignee: United Rentals (North America), Inc., Stamford, CT (US)

( * ) Notice: Subject to any disclaimer, the term of this patent is extended or adjusted under 35 U.S.C. 154(b) by 595 days.

(21) Appl. No.: 13/247,729

(22) Filed: Sep. 28, 2011

Related U.S. Application Data

(60) Provisional application No. 61/390,901, filed on Oct. 7, 2010.

(51) Int. Cl.

| | |
|---|---|
| ***G06Q 10/00*** | (2012.01) |
| ***G06Q 50/30*** | (2012.01) |
| ***G06Q 50/08*** | (2012.01) |
| ***G06Q 50/04*** | (2012.01) |
| ***G06Q 50/02*** | (2012.01) |

(52) U.S. Cl.
CPC ............ *G06Q 10/20* (2013.01); *G06Q 50/02* (2013.01); *G06Q 50/04* (2013.01); *G06Q 50/08* (2013.01); *G06Q 50/30* (2013.01)

(58) Field of Classification Search
CPC ........................................ G06Q 10/00
USPC ........................................ 705/1.1
See application file for complete search history.

(56) References Cited

U.S. PATENT DOCUMENTS

2002/0186144 A1* 12/2002 Meunier .................. 340/825.28
2008/0154671 A1* 6/2008 Delk .................. G01N 33/0075
2009/0069999 A1* 3/2009 Bos ........................ G07C 5/085 701/102
2010/0042453 A1* 2/2010 Scaramellino et al. .......... 705/7
2011/0087508 A1* 4/2011 McConnell et al. ......... 705/7.11
2011/0112991 A1* 5/2011 Scheid ................... G06Q 30/02 705/500
2011/0246246 A1* 10/2011 Johnson ................ G06Q 10/02 705/5
2011/0251750 A1* 10/2011 Fields et al. .................... 701/32

OTHER PUBLICATIONS

Aspen Pitkin County Airport, Greenhouse Gas Emissions Inventory, 2006.*
"Appendix A-1: Air Pollutant Emission Estimations for the Port of Long Beach Administration Building and Maintenance Facility Project," available online at http://www.polb.com/civica/filebank/blobdload.asp?BlobID=5950, Nov. 2008.*
US Department of Transportation Federal Aviation Administration, "Cincinnati/Northern Kentucky International Airport: Final Environmental Impact Statement Section 303c Evaluation," Sep. 2001.*
(Continued)

*Primary Examiner* — Jan P Mincarelli
(74) *Attorney, Agent, or Firm* — K&L Gates LLP

(57) ABSTRACT

A method of determining emissions from a one or more equipment operated by a user for a period. The method includes storing engine data for of the one or more equipment and receiving the utilization of each of the one or more equipment over the period. The emissions are then calculated for each of the one or more equipment based, at least in part, on each of the engines' utilization and engine data. The total of the calculated emissions is then determined.

16 Claims, 4 Drawing Sheets

30

OIL CHANGE FREQUENCY INTERVALS

A B C $FACTOR_{PM} = 1$ $FACTOR_{PM} = 0.9$ $FACTOR_{PM} = 0.8$ $t_0$ $t_1$ 30,000 $t_2$ 60,000 $t_3$ 90,000

LAST OIL CHANGE

TIME (HRS)

(56) References Cited

OTHER PUBLICATIONS

US EPA Office of Air and Radiation, "Nonroad Engine and Vehicle Emission Study—Report," Nov. 1991 (hereinafater "EPA Nonroad") (available online at https://www3.epa.gov/nonroad/documents/21a2001.pdf).*

Lindhjem et al., "Emission Deterioration Factors for the NONROAD Emissions Model," Report No. NR-011, Sep. 4, 1998 (hereinafter "Emission Deterioration") (available online at https://www3.epa.gov/otaq/models/nonrdmdl/nr-011.pdf).*

California Air Review Board, "Final Regulation Order: Regulation for In-Use Off-Road Diesel Vehicles," archived by Web Archive on Sep. 29, 2009 and available in archived form at http://web.archive.org/web/20090929001402/http://www.arb.ca.gov/regact/2007/ordiesl07/frooal.pdf).*

San Jose Technology, Inc., "CT-58 GPS/GSM Micro Tracker," Oct. 20, 2009, Version 2.04, available online at http://www.stepglobal.com/pdfs/VEHICLE_ASSET%20TRACKING%20(D)%20Personal%20Tracking%20Units/CT_58%20V2.04%20User%20Manual.pdf.*

* cited by examiner

SYSTEM AND METHOD FOR UTILIZATION-BASED COMPUTING OF EMISSIONS ATTRIBUTABLE TO SPECIFIC EQUIPMENT

CROSS-REFERENCE TO RELATED APPLICATIONS

The present application claims priority to U.S. Provisional Application No. 61/390,901, filed Oct. 7, 2010 and entitled "System and Method for Utilization-Based Computing of Emissions Attributable to Specific Equipment," the disclosure of which is incorporated in its entirety herein by reference.

TECHNICAL FIELD

The present disclosure generally relates to computer implemented systems and methods for determining emissions from equipment.

BACKGROUND OF THE INVENTION

Changes in the earth's climate continues to be a significant concern. Climate change is caused, in part, by global warming. Global warming is an increase in the average temperature of the earth's atmosphere over time. This increase in temperature is caused by natural occurrences and human activity. One of man's primary activities that cause global warming is the burning of fossil fuels such as oil, coal and natural gas. The burning of fossil fuels produces greenhouse gas emissions such as carbon dioxide, methane and nitrous oxide. Greenhouse gases trap heat and warm the earth's atmosphere and this is known as the greenhouse effect. Greenhouse gases have been increasing over time and it is estimated that the greenhouse effect will cause the temperature of the earth's surface to continue to increase. The combustion of fossil fuels also produces other polluting emissions such as hydrocarbons, nitrogen oxides, carbon monoxide and particulate matter. As such, the total emissions from equipment may include greenhouse gas emissions and other pollutant emissions.

Federal and state governments of the United States have been regulating emissions caused by various economic activities such as manufacturing transportation, electricity generation, agriculture etc. Moreover, many entities voluntarily adopt sustainability initiatives geared towards measuring and reducing greenhouse gas and other emissions. In order for an entity to meet governmental regulations and/or voluntarily reduce emissions, however, the entity must be able to determine the amount of greenhouse gases and other pollutants being emitted by the entity's activities. While there are known methods of estimating the amount of greenhouse gases and other pollutants emitted by different types of equipment, to get the total emissions for an entity that operates several pieces of equipment is traditionally a tedious, labor intensive and expensive exercise. Furthermore, estimations of the amount of greenhouse gases that are produced from engines typically involves broad assumptions and may not take into consideration all the factors that influence the actual amount of emissions. Therefore, there exists a need for an accurate, easily implemented and inexpensive system for determining the emissions of one or more pieces of equipment being operated by an entity.

BRIEF SUMMARY OF THE INVENTION

The present invention is directed generally to systems and methods for determining the emissions from one or more pieces of equipment operated by an entity over a period of time. As used herein, equipment includes any type of machinery that causes emissions such as stationary equipment (e.g., electric generators) or mobile equipment (e.g., on and off road vehicles). According to certain embodiments of the invention, the method includes calculating the emissions for each piece of equipment based, at least in part, on the utilization of the equipment and stored data about the engine of each piece of equipment. Each piece of the equipment is monitored and utilization information for the use of the equipment by an operator over a period of time is communicated, for example, from the equipment, to a system capable of determining emissions based on the utilization information. The system has parameter information (e.g., fixed parameters) about the equipment stored to a computer-readable data storage medium. The system uses the fixed parameters information and variable parameters information (e.g., the received utilization and/or maintenance records, etc.) that are applicable to the given monitored piece of equipment, a corresponding amount of emission(s) that is attributable to the use of the piece of equipment by the operator over the period of time.

In certain embodiments of the invention, the system may determine the emissions of a plurality of pieces of equipment distributed among a plurality of different entities having one or more operators of one or more pieces of equipment. The system may also allocate the aggregate emission(s) for each entity and/or each operator's use of his/her respective piece(s) of equipment.

Further, in certain embodiments of the invention, the equipment being monitored may be equipment rented from an equipment renter. The renter may operate the system that monitors the emissions of the rented equipment. The system stores information about each rented piece of equipment. The renter's use of the rented piece(s) of equipment is monitored and the corresponding emission(s) are computed and allocated to the renter. In certain embodiments, the renter may also own some of the equipment being monitored. As such, emissions may be calculated for the total equipment operated by the renter, that is, including rented and owned equipment. Alternatively and/or additionally, the emissions for rented equipment and owned equipment may be separately calculated.

Further yet, in certain embodiments of the invention, the system may also monitor piece(s) of equipment not rented in addition to or instead of the rented equipment. Implementing embodiments of the invention as described above offers operators a system that provides an easy, efficient convenient and accurate determination of their respective emissions resulting from their respective use of one or more pieces of equipment. For example, a contractor may have a contract that involves operating equipment at three different concurrently operating construction sites. The contract may have a term that requires reporting the total emissions from the three different construction sites. Faced with this scenario, the contractor could be provided with a service that uses embodiments of the invention to meet this contract term of reporting total emissions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

One method that has been used to track the amount of emissions from a plurality of equipment at an entity's site includes tracking the type and amount of fuel that is used by each piece of equipment operated by the entity. Based on the amount of fuel used, a calculation is made as to the amount of greenhouse gases and other pollutants each piece of equipment generates. In much equipment, however, there is no fuel meter. Therefore, manually tracking the fuel consumed and compiling fueling records can be tedious and labor intensive for entities that operate, for example, hundreds of different pieces of equipment.

Figure 1A:
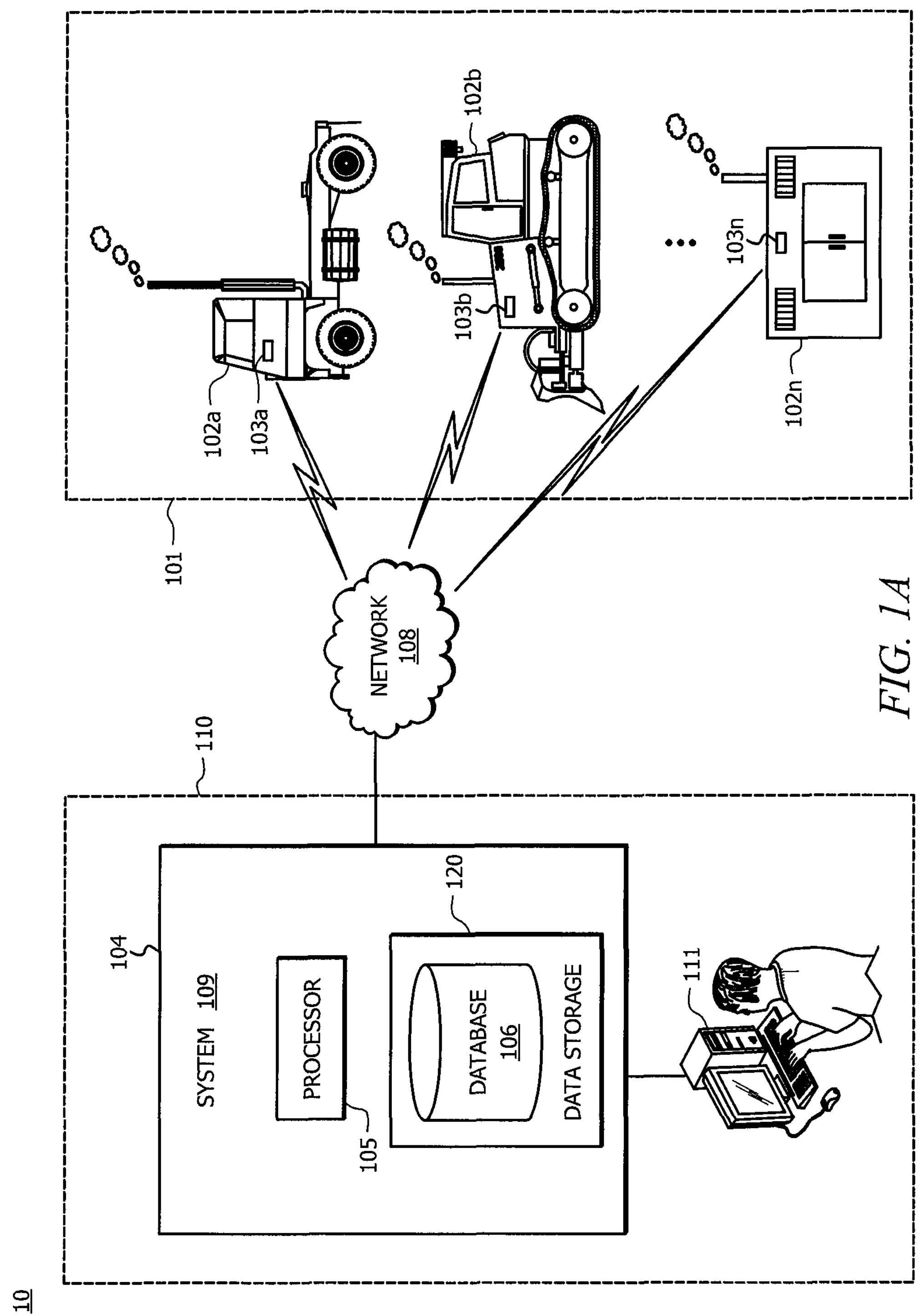
FIG. 1A is a block diagram showing a system according to one embodiment of the invention.

FIG. 1A shows system 10 according to one embodiment of the invention. System 10 provides a system for calculating emissions for an entity 101 that operates one or more pieces of emission generating equipment and, in the example shown, operates a plurality of such pieces of equipment 102*a*-102*n*. Equipment 102*a*-102*n* burns fossil fuels as a source of energy and thereby produces emissions. Of course, equipment 102*a*-102*n* may burn other fuel and/or other otherwise produce emissions. In one embodiment of the invention, entity 101 rents equipment 102*a*-102*n* from entity 110, which operates system 109. System 109 is a computer implemented system designed to accurately calculate the emissions of entity 101, based on the emissions from each piece of equipment 102*a*-102*n*, in certain embodiments, without requiring manual input of utilization information by entity 101. In some embodiments, entity 101 and entity 110 may be different branches of the same company. Additionally, or alternatively, in some embodiments instead of renting equipment 102*a*-102*n*, entity 101 may own this equipment.

Equipment 102*a*-102*n* includes utilization trackers 103*a*-103*n* for tracking the utilization (e.g., amount of time of use) of equipment 102*a*-102*n* over a period of time. Utilization trackers 103*a*-103*n*, for example, may be a hour meter, a vibration tracker or the like, that records the utilization of equipment 102*a*-102*n*. In certain embodiments of the invention, utilization trackers 103*a*-103*n* could be fuel use detectors that communicate fuel use as a way of monitoring equipment utilization. Preferably, utilization trackers 103*a*-103*n* are operable to wirelessly communicate the utilization information over network 108 to system 109. Alternatively or additionally, utilization trackers 103*a*-103*n* may be equipped with USB or other connectors to which a mobile device, such as a laptop computer or other device may be connected to collect the utilization information. The collected utilization information may then be sent, wirelessly or through a wired connection such as ethernet, over network 108 to system 109.

System 109 includes processor 105 and data storage 120. Data storage 120 includes database 106. Communications between Utilization trackers 103*a*-103*n* and system 109 may be by a network such as Internet 108.

Figure 1B:
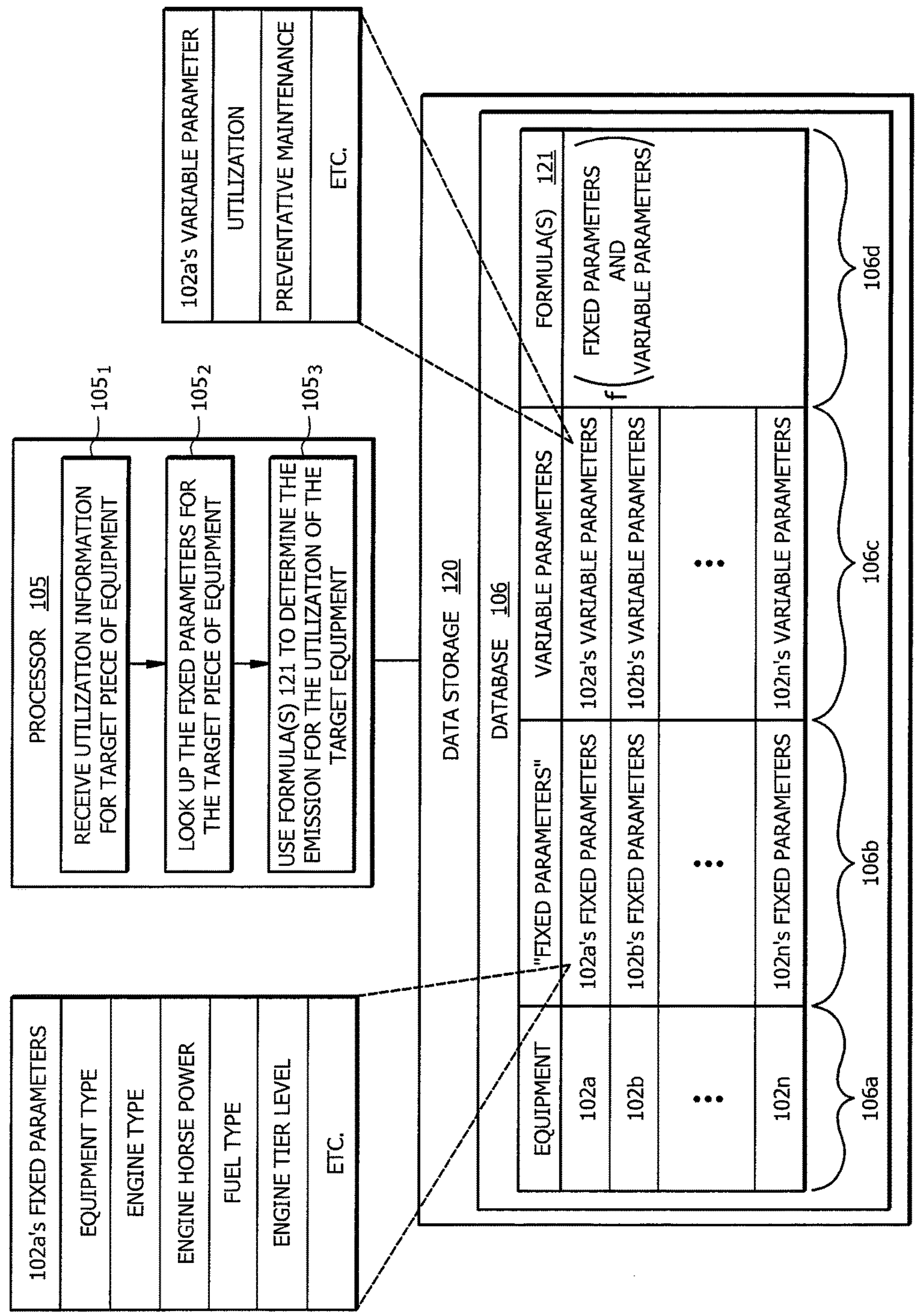
FIG. 1B is a block diagram that illustrates an exemplary architecture and operation of one embodiment of the invention.

FIG. 1B is a block diagram that illustrates an exemplary architecture and operation of system 109. Data storage 120 includes database 106. Database 106 is adapted to store identification of each piece of equipment 102*a*-102*n* in fields 106*a*. In fields 106*b*, fixed parameters information is stored with respect to each piece of equipment 102*a*-102*n*. This information includes but is not limited to equipment or vehicle type, engine make, engine model, engine model year, engine displacement, engine horsepower, engine tier level, fuel type and whether the engine is turbocharged or naturally aspirated. It should be noted that "fixed parameters" as used herein does not mean the parameters cannot change. To the contrary, some of these parameters could change. For example, the engine of a piece of equipment may be modified from naturally aspirated to turbo charged. If this is done for any piece of equipment, the appropriate field would be updated in field 106*b*. "Fixed parameters", therefore, merely indicates that these are parameters that are likely to change less than the variable parameters discussed hereinafter.

Variable parameters are, for example, the utilization and the preventive maintenance metrics of respective pieces of equipment. Variable parameters are stored in field 106*c*. These variable parameters may be received periodically from utilization trackers 103*a*-103*n* to update fields 106*c*. Field 106*d* holds one or more formulas for calculating emissions from each piece of equipment 102*a*-102*n* and the total emissions of a subset of or all of equipment 102*a*-102*n*. Processor 105 may be configured to make the emission calculations. For example, in step 1051, processor 105 reads field 106*c* for the utilization information for a target piece of equipment. Processor 105 may then lookup the fixed parameters for that piece of equipment at field 106*a*. Processor 105 may then access formulas 121 at field 106*d* and use the fixed parameters and the variable parameters for the target piece of equipment to calculate emissions from the target piece of equipment.

Figure 2:
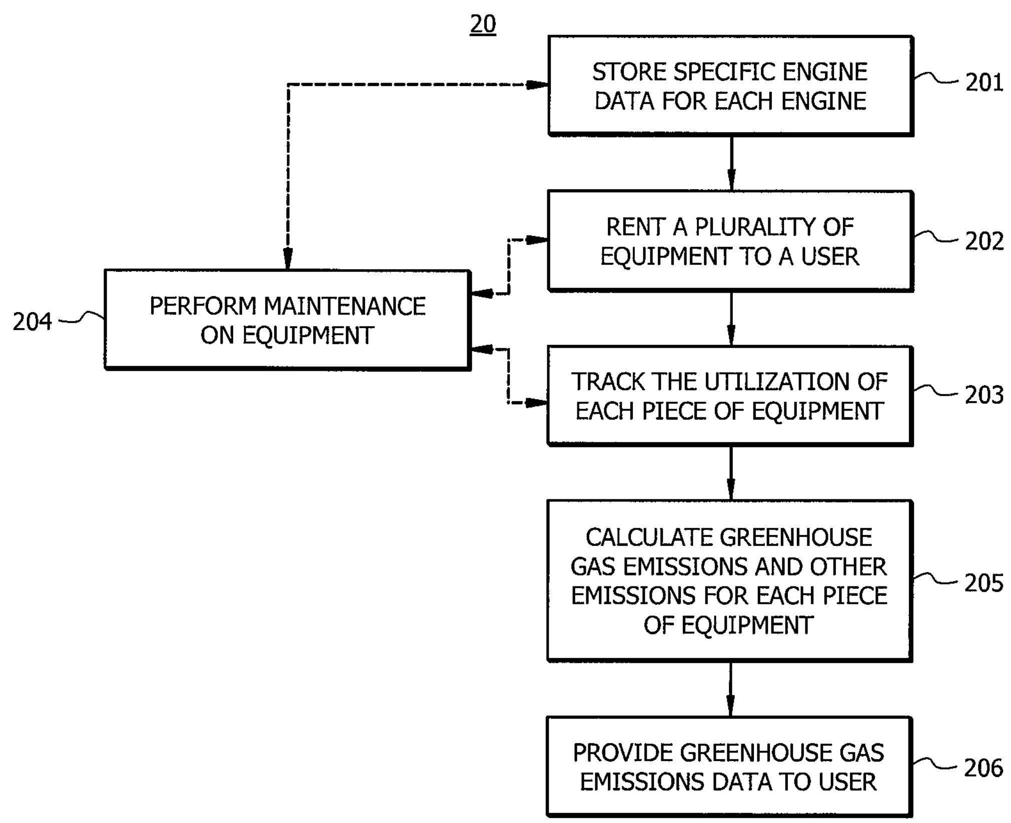
FIG. 2 is a flow diagram showing a process for calculating the emissions, according to one embodiment of the invention.

FIG. 2 shows an exemplary process according to one embodiment of the invention for the operation of system 109 to determine the emissions of equipment 102*a*-102*n*. In this example, entity 110 owns equipment 102*a*-102*n* and rents this equipment to entity 101. Prior to renting equipment 102*a*-102*n*, however, entity 110 may store information, in database 106, about each piece of equipment 102*a*-102*n*. This information includes specific engine data for equipment 102*a*-102*n*. The specific engine data may include information such as equipment or vehicle type, engine make, engine model, engine model year, engine displacement, engine horsepower, engine tier level, fuel type and whether the engine is turbocharged or naturally aspirated and the like. This type of fixed parameter information may be used, as discussed hereinafter, in computing emissions for use of a corresponding piece of equipment.

At step 202 entity 110 rents equipment 102*a*-102*n* to entity 101. Entity 101 operates each of equipment 102*a*-102*n* for different periods of time. Utilization trackers 103*a*-103*n*, however, records the utilization applicable to each of equipment 102*a*-102*n* and transmits this information wirelessly, via network 108, to a server, as shown in step 203. The server receives the transmitted information, which is sent to database 106 to be stored.

Step 204 involves the performance of preventive maintenance on equipment 102*a*-102*n*. Most industrial equipment is sold with original equipment manufacturer's (OEM's) recommendations regarding the maintenance that should be performed on each piece of equipment. If this maintenance schedule is followed, the performance of the equipment will be optimal. Thus, properly maintained equipment will emit less greenhouse gases than poorly maintained equipment. As such, step 204 performs maintenance of equipment 102*a*-102*n* according to a predetermined schedule such as the OEM's recommended preventive maintenance schedule or as close to the schedule as possible.

At step 205, processor 105 calculates the greenhouse gas emissions and other emissions based on the utilization of each piece of equipment and other parameters. Outlined below are the formulas that may be used by processor 105 to compute the different types of emissions according to certain embodiments of the invention. It should be noted that all the data required for these calculations may be stored on database 106 or provided to processor 105 from another data base.

Greenhouse Gas Emissions

Greenhouse gas emissions are reported in "carbon dioxide equivalent" ($CO_2$-e). Global warming potential (GWP) is a measure of how much a particular greenhouse gas contributes to global warming. The United States Environmental Protection Agency recognizes the following greenhouse gases as having the following GWPs:

A. Carbon Dioxide ($CO_2$), GWP=1 $CO_2$-e;
B. Methane ($CH_4$), GWP=21 $CO_2$-e;
C. Nitrous Oxide ($N_2O$), GWP=310 $CO_2$-e;
D. Hydrofluorocarbons (HFCs), GWP=12-11,700 $CO_2$-e;
E. Perfluorocarbons (PFCs), GWP=6,500-9,200 $CO_2$-e; and
F. Sulfur Hexafluoride ($SF_6$), GWP=23,900 $CO_2$-e.

The following equation may be used to calculate greenhouse gas emissions in certain embodiments of the invention:

$$(\text{Emissions}_{GHG,CO2\text{-}e})=[1\times(\text{Emissions}_{CO2})]+[21\times(\text{Emissions}_{CH4})]+[310\times(\text{Emissions}_{N2O})]$$

Where:

1. $\text{Emissions}_{CO2}$ is the total carbon dioxide ($CO_2$) emissions of the piece of equipment during a period, in units of metric tons;
2. $\text{Emissions}_{CH4}$ is the total methane ($CH_4$) emissions of the piece of equipment during the period, in units of metric tons;
3. $\text{Emissions}_{N2O}$ is the total nitrous oxide ($N_2O$) emissions of the piece of equipment over the period, in units of metric tons; and
4. 1, 21, and 310 are the global warming potential values for $CO_2$, $CH_4$, and $N_2O$, respectively.

Carbon Dioxide Emissions

As the above formula shows, carbon dioxide emission is one component used for calculating the total greenhouse gas emissions. Carbon dioxide is a byproduct of burning fossil fuels. The following equation may be used to calculate carbon dioxide emissions in certain embodiments of the invention:

$$(\text{Emissions}_{CO2})=(\text{FuelConsumption})\times(\text{EF}_{CO2})\times(0.001)$$

Where:

1. $\text{Emissions}_{CO2}$ is the total carbon dioxide emissions of the piece of equipment over a period, in units of metric tons;
2. Fuel Consumption is the amount of fuel consumed by the equipment's engine over a period, in units of gallons, calculated as shown below;
3. $\text{EF}_{CO2}$ is the standard carbon dioxide emission factor in units of kg $CO_2$/gallon fuel; and
4. 0.001 is the unit conversion from kilograms to metric tons, in units of kg/metric tons.

The $CO_2$ emission factors ($\text{EF}_{CO2}$) for fuel combustion, applicable for embodiments of the invention, are shown in Table 1 below.

TABLE 1

CARBON DIOXIDE EMISSION FACTORS*

| Fuel | Emission Factor ($\text{EF}_{CO2}$) | Units |
|---|---|---|
| Diesel | 10.16 | Kg $CO_2$/gallon |
| Gasoline | 8.78 | Kg $CO_2$/gallon |
| LPG | 5.79 | Kg $CO_2$/gallon |

*Source: USEPA Proposed mandatory Greenhouse Gas Reporting Rule, Federal Register, Vol. 74, No. 68.

Fuel Consumed

One aspect of calculating carbon dioxide emissions is determining the fuel consumption of each piece of equipment. The following equation may be used to calculate fuel consumption in certain embodiments of the invention:

$$(FuelConsumption)=\frac{(Hrs)\times(BFC_{max})\times(LF_{CatClass})}{(\text{Factor}_{PM})}\times(\text{Factor}_{\rho})$$

Where:

1. Hrs is a piece of equipment's hours of use during a period, in units of hours found by subtracting a hour meter reading at the beginning of the period from the hour meter reading at the end of the period; and
2. $BFC_{Max}$ is the maximum brake fuel consumption of the respective piece of equipment's engine, in units of lbs/hr. $BFC_{Max}$ values are available from equipment/engine manufacturers.
3. $LF_{CatClass}$ is the average load factor associated with each piece of equipment having "Cat-Class" category in units of %, available from EPA420-P-04-005: Median Life, Annual Activity, and Load Factor Values for Nonroad Engine Emissions Modeling, United States Environmental Protection Agency, 2004, which is incorporated herein, in its entirety, by reference.
4. $\text{Factor}_{PM}$ is a factor that accounts for a decrease in engine performance based on inefficiencies in equipment preventive maintenance; and 5. $Factor_\rho$ is a mass-to-volume unit conversion factor, based on the density of the fuel, and shown in Table 2 below.

TABLE 2

DENSITY CONVERSION FACTOR ($Factor_\rho$) BY FUEL TYPE*

| Fuel | $Factor_\rho$ | Units |
|---|---|---|
| Diesel | 0.1410 | Gallon/lb |
| Gasoline | 0.1647 | Gallon/lb |
| LPG | 0.2200 | Gallon/lb |

*These values are typical of fuel specifications but should be verified with fuel suppliers.

Methane Gas Emissions

Methane gas emission is also a contributor to the total greenhouse gas emissions. Methane gas is produced when there is incomplete combustion of fossil fuels. The following equation may be used to calculate methane gas emissions in certain embodiments of the invention:

$$(Emissions_{CH4})=(FuelConsumed)\times(EF_{CH4})\times(0.001)$$

Where:

1. $Emissions_{CH4}$ is the total methane emissions of the piece of equipment during a period, in units of metric tons;
2. Fuel Consumed is the amount of fuel that is consumed during a period, in units of gallons;
3. $EF_{CH4}$ is the standard methane emission factor, based on fuel type, and shown in Table 3 below; and
4. 0.001 is the unit conversion from kilograms to metric tons, in units of kg/metric tons.

TABLE 3

METHANE EMISSION FACTORS

| Fuel | Emission Factor ($EF_{CH4}$) | Units |
|---|---|---|
| Diesel | $4.17 \times 10^{-4}$ | Kg $CH_4$/gallon |
| Gasoline | $3.72 \times 10^{-4}$ | Kg $CH_4$/gallon |
| LPG/CNG | $9.20 \times 10^{-5}$ | Kg $CH_4$/gallon |

*Source: USEPA Proposed Mandatory Greenhouse Gas Reporting Rule, Federal Register, Vol. 74, No. 68.

Nitrous Oxide Emissions

Nitrous oxide ($N_2O$) emissions are caused by non-ideal combustion of fossil fuels. During non-ideal combustion, nitrogen gas from the air intake reacts with oxygen. The following equation may be used to calculate nitrous oxide emissions in certain embodiments of the invention:

$$(Emissions_{N2O})=(FuelConsumed)\times(EF_{N2O})\times(0.001)$$

Where:

1. $Emissions_{N2O}$ is the total nitrous oxide emissions of the piece of equipment during a period, in units of metric tons;
2. Fuel Consumed is the amount of fuel that is consumed during a period, in units of gallons;
3. $EF_{N2O}$ is a standard methane emission factor, based on fuel type, and shown in Table 4 below; and
4. 0.001 is the unit conversion from kilograms to metric tons, in units of kg/metric tons.

TABLE 4

$N_2O$ EMISSION FACTORS

| Fuel | Emission Factor ($EF_{N2O}$) | Units |
|---|---|---|
| Diesel | $8.34 \times 10^{-5}$ | Kg $N_2O$/gallon |
| Gasoline | $7.44 \times 10^{-5}$ | Kg $N_2O$/gallon |
| LPG/CNG | $9.20 \times 10^{-6}$ | Kg $N_2O$/gallon |

*Source: USEPA Proposed Mandatory Greenhouse Gas Reporting Rule, Federal Register, Vol. 74, No. 68.

Other Pollutant Emissions

Apart from greenhouse gases, there are other emissions from combustion engines that pollute the atmosphere. Hydrocarbons (HC), Nitrogen Oxides (NOx), Carbon Monoxide (CO), and Particulate Matter (PM) are some of these pollutants. Some HC and NOx emission factors may be reported by manufacturers as a combined value (HC+NOx). The following equation may be used to calculate combined HC+NOx emissions in certain embodiments of the invention:

$$(EF_{HC+NOx,approximated})=(EF_{HC})+(EF_{NOx})$$

Where:

1. $EF_{HC+NOx}$, approximated is the estimated combined emission factor for hydrocarbons (HC) and nitrogen oxides (NOx);
2. $EF_{HC}$ is the hydrocarbon emission factor for the respective piece of equipment, in units of gram/HP/hr, provided by the equipment manufacturer; and
3. $EF_{NOx}$ is the nitrogen oxide emission factor for the respective piece of equipment, in units of gram/HP/hr, provided by the equipment manufacturer.

Hydrocarbon Emissions

Hydrocarbon (HC) emissions are caused by incomplete combustion of fossil fuels. Hydrocarbon emissions include unburned fuel and combustion by-products. An engine's tier rating is an indicator of the engine's hydrocarbon emissions. Tier ratings are used by regulatory agencies such as the EPA and California Air Resources Board. The following equation may be used to calculate hydrocarbon emissions in certain embodiments of the invention:

$$(Emission_{HC}) = \frac{(Hrs)\times(EF_{HC})\times(HP)\times(LF_{CatClass})}{(Factor_{PM})}\times(0.002205)$$

Where:

1. $Emissions_{HC}$ is the hydrocarbons emissions during a period, in units of lbs;
2. Hrs is a piece of equipment's hours of use during a period, in units of hours found by subtracting the hour meter reading at the beginning of the period from the hour meter reading at the end of the period;
3. $EF_{HC}$ is the hydrocarbon emission factor for the respective piece of equipment, in units of gram/HP/hr, provided by the equipment manufacturer;
4. HP is the rated maximum power output of the applicable piece of equipment, in units of horsepower;
5. $LF_{CatClass}$ is the average load factor associated with each equipment "Cat-Class" category, in units of %;
6. 0.002205 is the unit conversion from grams to pounds, in units of lbs/g]; and
7. $Factor_{PM}$ is a factor that accounts for a decrease in engine performance based on inefficiencies in equipment preventive maintenance.

Nitrogen Oxide Emissions

Nitrogen Oxides (NOx) emissions are produced when nitrogen and oxygen react under high temperature and pressure conditions in the combustion chamber of an engine. An engine's tier rating is an indicator of the engine's NOx emissions. The following equation may be used to calculate nitrogen oxide emissions in certain embodiments of the invention:

$$(\text{Emissions}_{NOx}) = \frac{(Hrs)\times(EF_{NOx})\times(HP)\times(LF_{CatClass})}{(\text{Factor}_{PM})}\times(0.002205)$$

Where:

1. $\text{Emissions}_{NOx}$ is the carbon monoxide emissions during a period, in units of lbs;
2. Hrs is a piece of equipment's hours of use during a period, in units of hours found by subtracting the hour meter reading at the beginning of the period from the hour meter reading at the end of the period;
3. $\text{EF}_{NOx}$ is the hydrocarbon emission factor for the respective piece of equipment, in units of gram/HP/hr, provided by the equipment manufacturer;
4. HP is the rated maximum power output of the applicable piece of equipment, in units of horsepower;
5. $\text{LF}_{CatClass}$ is the average load factor associated with each equipment "Cat-Class" category, in units of %.
6. 0.002205 is the unit conversion from grams to pounds, in units of lbs/g; and
7. $\text{Factor}_{PM}$ is a factor that accounts for a decrease in engine performance based on inefficiencies in equipment preventive maintenance.

Carbon Monoxide

Carbon Monoxide (CO) emissions are caused by the incomplete combustion of fossil fuels. An engine's tier rating is an indicator of the engine's CO emissions. The following equation may be used to calculate carbon monoxide emissions in certain embodiments of the invention:

$$(\text{Emissions}_{CO}) = \frac{(Hrs)\times(EF_{CO})\times(HP)\times(LF_{CatClass})}{(\text{Factor}_{PM})}\times(0.002205)$$

Where:

1. $\text{Emissions}_{CO}$ is the carbon monoxide emissions during a period, in units of lbs;
2. Hrs is a piece of equipment's hours of use during a period, in units of hours found by subtracting the hour meter reading at the beginning of the period from the hour meter reading at the end of the period;
3. $\text{EF}_{CO}$ is the hydrocarbon emission factor for the respective piece of equipment, in units of gram/HP/hr, provided by the equipment manufacturer;
4. HP is the rated maximum power output of the applicable piece of equipment, in units of horsepower;
5. $\text{LF}_{CatClass}$ is the average load factor associated with each equipment "Cat-Class" category, in units of %;
6. 0.002205 is the unit conversion from grams to pounds, in units of lbs/g; and
7. $\text{Factor}_{PM}$ is a factor that accounts for a decrease in engine performance based on inefficiencies in equipment preventive maintenance.

Particulate Matter

Particulate Matter (PM) emissions includes the soot, ash, and other chemical agglomerations formed in the engine. An engine's tier rating is an indicator of the engine's PM emissions. The following equation may be used to calculate particulate matter emissions in certain embodiments of the invention:

$$(\text{Emissions}_{PM}) = \frac{(Hrs)\times(EF_{PM})\times(HP)\times(LF_{CatClass})}{(\text{Factor}_{PM})}\times(0.002205)$$

Where:

1. $\text{Emissions}_{PM}$ is the particulate matter emissions during a period, in units of lbs;
2. Hrs is a piece of equipment's hours of use during a period, in units of hours found by subtracting the hour meter reading at the beginning of the period from the hour meter reading at the end of the period;
3. $\text{EF}_{PM}$ is the particulate matter emission factor for the respective piece of equipment, in units of gram/HP/hr, provided by the equipment manufacturer;
4. HP is the rated maximum power output of the applicable piece of equipment, in units of horsepower;
5. $\text{LF}_{CatClass}$ is the average load factor associated with each equipment "Cat-Class" category, in units of %;
6. 0.002205 is the unit conversion from grams to pounds, in units of lbs/g; and
7. $\text{Factor}_{PM}$ is a factor that accounts for a decrease in engine performance based on inefficiencies in equipment preventive maintenance.

To summarize, in certain embodiments of the invention, the above formulas may be used to calculate emissions for entity 101 using the utilization of each piece of equipment 102*a*-102*n* and other parameters such as load factor, fuel consumption, density conversion, emission factors, horse power/tier levels and preventive maintenance metrics. It should be noted that the preventive maintenance metrics are derived from the maintenance performed in process 204. As mentioned above, because preventive maintenance affects the level of performance of an engine, preventive maintenance metrics may be used to calculate the greenhouse gas emissions from each of equipment 102*a*-102*n*. In certain embodiments of the invention, for each 1% decrease in the preventive maintenance metric, the engine emissions are increased by 0.1%. In certain embodiments of the invention, the preventive maintenance metric may be a sliding scale system.

Figure 3:
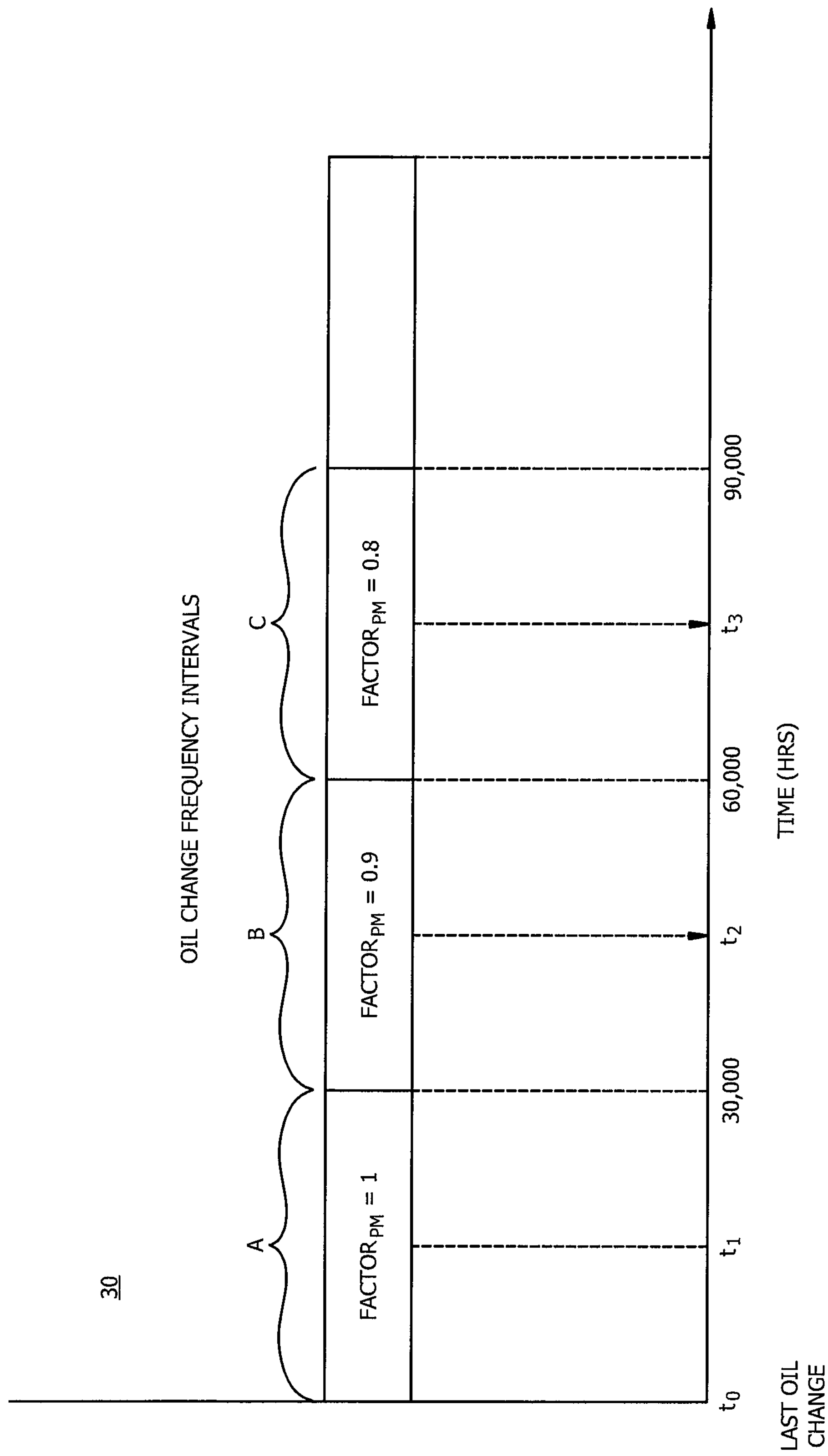
FIG. 3 shows a block diagram illustrating a sliding scale system according to certain embodiments of the invention.

FIG. 3 shows a block diagram illustrating a sliding scale system according to certain embodiments of the invention. FIG. 3 shows chart 30 that illustrates a preventive maintenance metric pertaining to oil change frequency interval for a particular engine in a vehicle. The OEM may recommend that the oil change interval for the engine should be every 30,000 hours. On chart 30, t0 indicates the mileage at the last oil change. The system that tracks preventive maintenance metrics may be set up so that if the engine's oil is changed within window A, for example at t1 (between t0 and 30,000 hours of operation) then the oil change interval does not have a negative impact on the emissions levels of the vehicle. As such, $\text{Factor}_{PM}$ will be equal to 1. However, if the oil change is performed in window B, for example, at t2 (between 30,000 and 60,000 hours) then this is outside the acceptable window and causes increased emissions in the period between 30,000 hours and t2 hours. Accordingly, this vehicle will be assigned $\text{Factor}_{PM}$ equal to 0.9 for the period 30,000 hours to t2 hours. After the oil change at t2, chart 30 for the vehicle may be reset to t0. If, however, the oil change is done, during window C, for example, at t3 (between 60,000 hours and 90,000 hours) then $\text{Factor}_{PM}$ equal to 0.8 may be set to apply for the period 60,000 hours to t3 hours. Moreover, there may be some permanent negative effect on the engine while the vehicle was being operated in window C. To account for this permanent negative effect on the engine and its impact on the emissions from the engine, the oil change at t3 does not automatically cause a reset of the chart to the situation where $Factor_{PM}$ is equal to 1. Instead, the $Factor_{PM}$ may be set to 0.95 until further maintenance is carried out on the engine to undo the permanent damage caused to the engine as a result of operating the engine in window C. For example, resetting to $Factor_{PM}$ equal to 1 from $Factor_{PM}$ equal to 0.8 may require that the engine be overhauled. It should be noted that $Factor_{PM}$ may be stored in computer readable medium and may be retrieved from the computer readable medium by a processor for calculating emissions. $Factor_{PM}$s may vary from equipment to equipment. Thus, certain embodiments of the invention may have different sets of $Factor_{PM}$s stored in a computer readable medium, which are applicable to different pieces equipment. It should also be noted that in embodiments of the invention the preventive maintenance may be carried out by the renter of the equipment, the entity renting the equipment or the entity operating the equipment.

In step 206 the emissions of entity 101, over a period, is provided to entity 101 by entity 110. The emissions may be provided for each piece of equipment or the total amount of emissions may be calculated and provided to entity 101. This may be done, for example, by providing the emissions on an invoice for equipment 102*a*-102*n* for a certain period. Operator 111 of entity 110 may also provide reports for entity 101, for example, that shows historical trends for a subset of equipment 102*a*-102*n*. Further, entity 101 may be provided with internet access to a website through which entity 101 may generate reports from entity 110's computer system 109. As such, entity 101 can select what information is to be included in the report. For example, entity 101 may need a report on particulates emissions for equipment 102*a*-102*n*. If so, entity 101 can make the necessary selections and generate that report.

In one embodiment, software instructions/routines, such as the software instructions for calculating emissions described further herein (e.g., steps 1051, 1052 and 1053 of FIG. 1B and steps 201, 203, 205 and 206 of FIG. 2) are implemented as a computer program product that provides at least a portion of the software instructions for an exemplary embodiment of the present invention. The computer program product can be installed by any suitable software installation procedure, as is well known in the art. In another embodiment, at least a portion of the software instructions may also be downloaded over a cable, communication and/or wireless connection.

All or a portion of the software instructions and/or data (e.g., data stored in database 106) may be communicated (e.g., across network 108 and/or within a given computer device) as signals propagating on a carrier or propagation medium. As used herein, a computer-readable storage medium refers to a tangible storage medium, such as a hard disk, ROM (DVD-ROM's, CD-ROM's), RAM, flash memory device, magnetic memory device (diskettes, tapes, etc.), and is not intended to refer merely to a propagating signal. As described herein, various processes (e.g., steps 1051, 1052 and 1053 of FIG. 1B and steps 201, 203, 205 and 206 of FIG. 2) may be implemented as computer-executable software instructions (or applications) that are stored to a computer-readable storage medium (e.g., hard disk, ROM, RAM, flash memory device, magnetic memory device, etc.) that when executing on a processor-based device (e.g., client computer system 109) performs the corresponding operations described herein.

Various elements of embodiments of the present invention may be implemented as computer-executable software instructions/applications stored to a computer-readable storage medium (e.g., hard disk, ROM, RAM, flash memory device, magnetic memory device, etc.) that when executing on a processor-based device (e.g., system 109) provides the corresponding functionality described herein for such element.

Many of the elements described herein, when implemented via computer-executable instructions, are in essence the software code defining the operations thereof. For instance, the above-described storing, tracking and calculating steps may comprise computer-executable software code that is stored to a computer-readable storage medium and is executed by a processor-based computing device (e.g., system 109) for performing the corresponding operations described herein. Further, the various operations described herein, such as those operations described with reference to the exemplary flow of (e.g., steps 1051, 1052 and 1053 of FIG. 1B and steps 201, 203, 205 and 206 of FIG. 2), as well as other operations described herein may be performed by computer-executable software code stored to a computer-readable storage medium and executing on a processor-based computing device. The executable instructions or software code may be obtained, for example, from a computer-readable storage medium or "storage device" (e.g., a hard drive media, optical media, EPROM, EEPROM, tape media, cartridge media, flash memory, ROM, memory stick, and/or the like). In certain embodiments, a CPU of a computing system or device may execute the various logical instructions according to embodiments of the present invention. For example, CPU of system 109 and/or client device 111 may execute machine-level instructions according to the exemplary operational flow described above in conjunction with processes described herein (e.g., steps 1051, 1052 and 1053 of FIG. 1B and steps 201, 203, 205 and 206 of FIG. 2).

It shall be appreciated that the present invention is not limited to the architecture of the computing system or device on which the various elements are implemented, such as any particular architecture of system 109 or device 111. The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, as examples. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining emissions by a lessor for lease equipment operated by a lessee over a period of time, each lease equipment comprising an engine producing emissions, the period of time being a lease, the method comprising the steps of:

(a) storing an original equipment manufacturer's recommended oil change frequency interval for a particular engine in a particular vehicle in the lease equipment, the interval measured in hours;

(b) storing engine data by the lessor, in a computer database, for each respective engine of the lease equipment;

(c) leasing the lease equipment from the lessor to the lessee;

(d) receiving automatically over a network by the lessor, actual utilization data of the lease equipment over the lease, the actual utilization data comprising an amount of use of the engine during the lease;

(e) storing, by the lessor, the actual utilization data in the computer database, and (i) establishing a first window with a first range of hours corresponding to the recommended oil change frequency interval for the particular engine;

(ii) establishing a second window with a second range of hours corresponding to an amount of hours exceeding the first range of hours, (iii) assigning a first preventive maintenance factor value to the first window and a second preventive maintenance factor to the second window, wherein the first preventive maintenance factor value is higher than the second preventive maintenance factor value, (iv) storing, in a memory in operative communication with a processor, an operative maintenance factor, the operative maintenance factor corresponding to the first preventive maintenance factor or the second preventive maintenance factor based on an observed level of preventive maintenance;

(v) performing an overhaul of the particular engine; and (vi) resetting the value of the operative preventive maintenance factor from the second preventive maintenance factor to the first preventive maintenance factor in response to determining that the particular engine has been overhauled;

(f) calculating, by a processor, emissions for the lease equipment based, at least in part, on the actual utilization data and the engine data for the lease equipment during the lease, and on the operative preventive maintenance factor; and (g) totaling, by said processor, the calculated emissions to obtain a total emissions during the lease.

2. The method of claim 1, wherein the lease equipment comprises a fleet of equipment.

3. The method of claim 1, further comprising the step of performing preventive maintenance on at least some of the lease equipment over the lease, and step f comprises adjusting said calculated emissions for the lease equipment based on which said performance of preventive maintenance meets a predetermined standard of preventive maintenance.

4. The method of claim 1, wherein the engine data comprises engine load factor, fuel consumption, density conversion, emission factors or horse power/tier level.

5. The method of claim 1, further comprising the step of providing the total emissions to the lessee.

6. The method of claim 1, further comprising the step of providing the total emissions to the lessee on an invoice.

7. The method of claim 1, further comprising the step of making a website available to the lessee, the website generating reports of the emission during the lease.

8. The method of claim 1, wherein step f comprises use of the following formula:

$$(\text{Emissions}_{GHG,CO2\text{-}e})=[1\times(\text{Emissions}_{CO2})]+[21\times(\text{Emissions}_{CH4})]+[310\times(\text{Emissions}_{N2O})]$$

9. The method of claim/wherein said carbon dioxide emissions is calculated using the formula:

$$(\text{Emissions}_{CO2})=(\text{FuelConsumption})\times(\text{EF}_{CO2})\times(0.001)$$

10. The method of claim 9 wherein said fuel consumed is calculated using the formula:

$$(FuelConsumption)=\frac{(Hrs)\times(BFC_{max})\times(LF_{CatClass})}{(\text{Factor}_{PM})}\times(\text{Factor}_p).$$

11. The method of claim 8 wherein said methane emissions is calculated using the formula:

$$(\text{Emissions}_{CH4})=(\text{FuelConsumed})\times(\text{EF}_{CH4})\times(0.001)$$

12. The method of claim 8 wherein said nitrous oxide emissions is calculated using the formula:

$$(\text{Emissions}_{N2O})=(\text{FuelConsumed})\times(\text{EF}_{N2O})\times(0.001)$$

13. The method of claim 1, wherein step f comprises use of the following formula:

$$(\text{Emission}_{HC})=\frac{(Hrs)\times(EF_{HC})\times(HP)\times(LF_{CatClass})}{(\text{Factor}_{PM})}\times(0.002205).$$

14. The method of claim 1, wherein step f comprises use of the following formula:

$$(\text{Emission}_{NOx})=\frac{(Hrs)\times(EF_{NOx})\times(HP)\times(LF_{CatClass})}{(\text{Factor}_{PM})}\times(0.002205).$$

15. The method of claim 1, wherein step f comprises use of the following formula:

$$(\text{Emission}_{CO})=\frac{(Hrs)\times(EF_{CO})\times(HP)\times(LF_{CatClass})}{(\text{Factor}_{PM})}\times(0.002205).$$

16. The method of claim 1, wherein step f comprises use of the following formula:

$$(\text{Emission}_{PM})=\frac{(Hrs)\times(EF_{CO})\times(HP)\times(LF_{CatClass})}{(\text{Factor}_{PM})}\times(0.002205).$$

* * * * *